United States Patent
Bakacha et al.

(10) Patent No.: US 8,690,401 B2
(45) Date of Patent: Apr. 8, 2014

(54) LIGHTING OR SIGNALING DEVICE WITH A MOVEABLE DAYTIME ELEMENT

(75) Inventors: Malik Bakacha, Belligne (FR); Jean-Claude Puente, Livry Gargan (FR); Pierre Albou, Paris (FR)

(73) Assignee: Valeo Vision, Bobigny (FR)

( * ) Notice: Subject to any disclaimer, the term of this patent is extended or adjusted under 35 U.S.C. 154(b) by 83 days.

(21) Appl. No.: 13/220,842

(22) Filed: Aug. 30, 2011

(65) Prior Publication Data

US 2012/0051070 A1 Mar. 1, 2012

(30) Foreign Application Priority Data

Aug. 31, 2010 (FR) ...................... 10 56875

(51) Int. Cl.
*B60Q 1/00* (2006.01)
(52) U.S. Cl.
USPC ........................................................ 362/464
(58) Field of Classification Search
USPC ........................................................ 362/464
See application file for complete search history.

(56) References Cited

U.S. PATENT DOCUMENTS

| 4,206,497 A | 6/1980 | Kressel |
| 4,644,448 A | 2/1987 | Heiler |
| 2004/0184279 A1* | 9/2004 | Molto et al. ................... 362/507 |
| 2008/0205055 A1* | 8/2008 | Schug et al. ................... 362/246 |

FOREIGN PATENT DOCUMENTS

| FR | 1162227 A | 9/1958 |
| JP | 61104248 U | 7/1986 |
| JP | 62105844 U | 7/1987 |
| JP | 63024044 U | 2/1988 |
| JP | 63151332 U | 10/1988 |
| JP | 63240440 A | 10/1988 |
| JP | 1009044 A | 1/1989 |
| JP | H01109444 U | 7/1989 |

* cited by examiner

*Primary Examiner* — Anh Mai
*Assistant Examiner* — Hana Featherly
(74) *Attorney, Agent, or Firm* — Jacox, Meckstroth & Jenkins

(57) ABSTRACT

A lighting and/or signalling device arranged so as to provide at least a first photometric function and a second photometric function, wherein the device comprises at least one moveable element on which at least the first photometric function is installed and the movement of which is subject to the operation of the second photometric function.

13 Claims, 4 Drawing Sheets

LIGHTING OR SIGNALING DEVICE WITH A MOVEABLE DAYTIME ELEMENT

CROSS-REFERENCE TO RELATED APPLICATIONS

This application claims priority to French Application No. 1056875 filed Aug. 31, 2010, which application is incorporated herein by reference and made a part hereof.

BACKGROUND OF THE INVENTION

1. Field of the Invention

The technical field of the present invention is that of lighting and/or signalling devices for automotive vehicles.

2. Description of the Related Art

A new lighting function has appeared recently on automotive vehicles. It is lighting that is switched on during the daytime. This function is ensured either by switching on a headlamp that is normally reserved for night-time use, or by installing a specific lighting device mounted on the front bumper of the vehicle.

In this second case, the daytime lighting device must meet a standard concerning the location on the vehicle and the power of the light beam of the daytime lighting device.

One drawback of this type of daytime-specific lighting device is that it requires a lot of space. Specifically, certain vehicles such as, for example, sports cars, have peculiarly shaped front bumpers, with sharp edges, on which it is impossible to install such a daytime lighting device while respecting the standard mentioned above. Furthermore, these sports vehicles often have retractable headlight optics so as to improve the aerodynamics and the appearance of the vehicle. In such a case it is impossible to use the headlamp intended for night-time use to provide the daytime lighting function because it would mean keeping these optical systems open constantly, whatever the conditions of use of the vehicle. This evidently runs contrary to the retractable function of this optical system and negates the aerodynamic and aesthetic advantages desired by manufacturers.

Moreover, manufacturers of these sports vehicles wish to ensure that their vehicles have an attractive outline that is as uncluttered as possible whereas such a daytime lighting device is liable to be detrimental to this attractive outline.

Finally, providing the space to install this daytime lighting device in the bumper requires additional design and production time on the part of the manufacturers of these bumpers.

It would therefore be good to find a solution that overcomes these drawbacks so that the daytime lighting device may be installed without degrading the appearance of the vehicle while respecting the aforementioned standard.

SUMMARY OF THE INVENTION

The object of the present invention is therefore to obviate the drawbacks described above, mainly by integrating the daytime lighting function with a lighting or signalling element of the vehicle, so as to allow it to be seen during the day while also making it possible for it to cede its place to conventional lighting under night-time conditions.

The subject of the invention is therefore a lighting and/or signalling device arranged so as to provide at least a first photometric function and a second photometric function, wherein the device comprises at least one moveable element on which at least the first photometric function is installed and the movement of which is subject to the operation of the second photometric function. It will firstly be noted that the first photometric function is advantageously different to the second photometric function. It may, for example, be that the first photometric function is a daytime lighting and/or signalling function and the second photometric function is a low beam and/or a high beam. It will also be understood that the moveable element is advantageously triggered when the second photometric function is activated. This movement of the moveable element may be a motion that makes the first photometric function substantially less visible.

According to a first feature of the invention, the operation of the first photometric function may be subject to the second photometric function. Specifically, the first photometric function is switched on or activated when the second photometric function is not in operation or is deactivated and it is switched off or deactivated when the second photometric function is started up, for example, when a sidelight, high beam or low beam is switched on.

According to a second feature of the invention, the element can rotate. Thus easy disengagement of the first photometric function, so as to make way for the second photometric function, is guaranteed.

According to another feature of the invention, the first photometric function comprises at least one light source comprising at least one light-emitting diode. This type of source is particularly advantageous because of its low electricity consumption and its low thermal losses relative to its light yield.

According to yet another feature of the invention, the first photometric function takes the form of a lighting means that comprises a support receiving the light source. The support thus forms a mounting that receives the source and it may advantageously call to mind the color of the bodywork. Thus the support comprises at least one face located on the light-source side, the face having an identical color to that of the bodywork. This may, for example, be a coat of paint. Finally, in such a case, the lighting means comprises a component, for example, a window, which is at least translucent and advantageously transparent, allowing the face of the support to be seen.

According to yet another feature of the invention, the moveable element and the support are rigidly connected. They, for example, form one and the same part.

Advantageously, the second function takes the form of a headlamp. The latter comprises components such as a light source, lens, reflector, and a switching device for switching from the high-beam function to the low-beam function.

More advantageously, the element bears the second photometric function. This guarantees that the movement of the moveable element also engages with it the second photometric function, for example, a headlamp and more generally headlight optics. Here, more particularly, the case of retractable front headlights mounted on sports vehicles is targeted. The face of the retractable headlights, commonly painted the color of the bodywork, is used to receive and serve as a support for the first photometric function.

The first photometric function and the second photometric function can rotate about the same axis. In this case it is extremely easy to integrate the first photometric function with an existing retractable headlight.

According to a first variant of the invention, the device comprises a housing inside of which are installed a headlamp forming the second photometric function and a light source, especially a light-emitting-diode-based light source, forming the first photometric function. Headlight optics enclosed on one side by a housing and on the other by a transparent screen, for example, a window thus bounding an internal volume, are targeted here, the internal volume receiving both the first photometric function and the second photometric function, the first being moveably mounted, and the second fixedly or moveably mounted, relative to the housing.

According to one feature of the invention, the lighting means forms a screen protecting the housing. This structure is particularly advantageous because it makes use of the first photometric function to form a barrier and prevent light rays (for example, sunlight) from entering into the interior of the housing. It will therefore be understood that the first photometric function is arranged so as to form a screen that protects the interior of the lighting and/or signalling device according to the invention. Degradation of certain parts of the housing or headlamp via concentration of daylight is therefore prevented.

In an improvement to the invention, the first photometric function is arranged in order to, or also serves to, provide a third photometric function. This third photometric function is, for example, the indicator function or sidelight or parking lamp function.

In such a case, the first photometric function comprises at least one light source comprising a plurality of light-emitting diodes, some of these diodes being arranged so as to provide the third photometric function. In such a case, the rest of the diodes are not activated or are activated at different powers. Thus use is made of certain components of the first photometric function to provide the third photometric function. Such a structure makes it possible to avoid using conventional components relative to the sidelight function, such as a dedicated light source or even its power supply bundle. This structure also avoids opening the retractable headlight, conventionally carried out when the sidelight function is activated.

Advantageously, the plurality of light-emitting diodes is mounted on a printed circuit board that has an end, the third photometric function being provided by at least one diode mounted on the end.

Generally, the lighting means may comprise at least one device intended to direct and/or reflect a light flux and a support formed especially by a printed circuit board. This device intended to direct and/or reflect a light flux is, for example, a light-reflecting plate or else a light guide.

This light guide may form part of the first photometric function and/or the second photometric function and/or the third photometric function. The same light guide may be used for both of these functions or a multiplicity of light guides may be used, each light guide being assigned one of these functions. This light guide is made of a transparent plastic and directs the light from the light source to one or more points where it is desired to see this light appear. This light guide is installed in line with the light-emitting diode or diodes associated with the function. Generally, the light guide or the reflecting plate may be an optical part produced from a material that is, for example, transparent.

The light guide is placed on the periphery of the moveable element or support. Thus it is guaranteed that the third photometric function will be highly visible without degrading the first photometric function.

By way of example, the light guide extends so as to form an arc.

Finally, the lighting means comprises a reflector dedicated to the first photometric function. Advantageously, this reflector may be incorporated with the aforementioned light guide. They are, in this case, one and the same part. This reflector advantageously has several flats joined by oblique slants, these slants serving to reflect the light coming from the light source.

One first advantage according to the invention resides in the possibility of integrating the daytime lighting function without degrading the appearance of the vehicle while respecting the criteria imposed by the current standard for this type of component.

Another advantage resides in obviating any difficulty with installing such a function in a front bumper.

Other features, objects, details and advantages of the invention will become clearer on reading the description given below by way of indication in relation to the appended drawings in which:

BRIEF DESCRIPTION OF THE ACCOMPANYING DRAWINGS

DETAILED DESCRIPTION OF THE PREFERRED EMBODIMENTS

It should be noted that the figures show the invention in detail so as to demonstrate the invention, the figures may of course be used to better define the invention if required.

Figure 1:
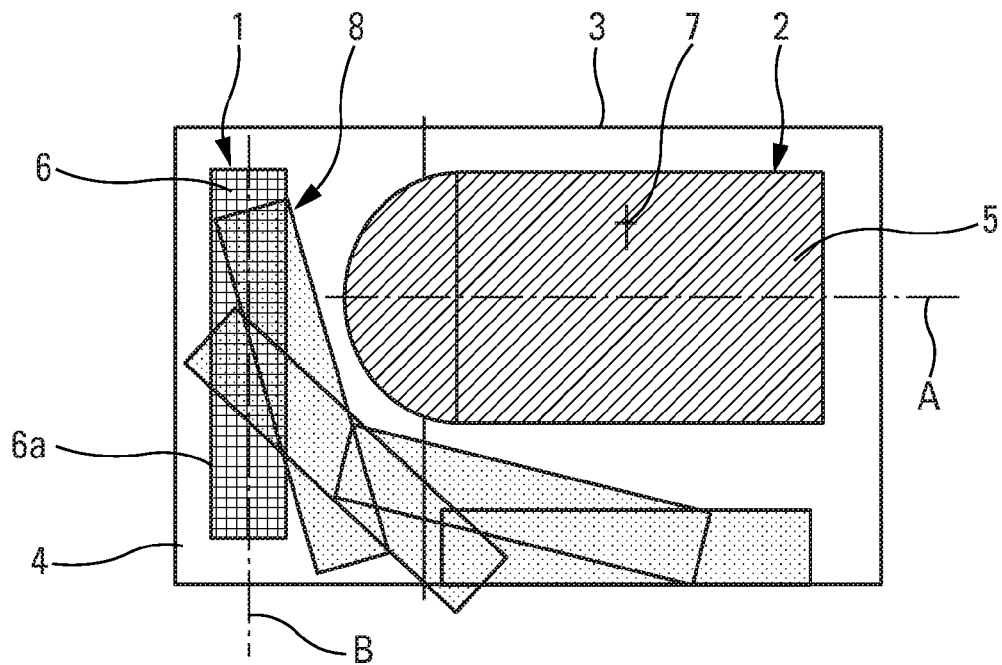
FIG. 1 is a schematic view of a first variant embodiment of the invention when the first photometric function is activated.

FIG. 1 illustrates schematically the lighting and/or signalling device as seen from above, under daytime conditions. This device is designed to be installed on the front part of the vehicle so as to deliver a light beam. It comprises at least two photometric functions 1 and 2. The first photometric function 1 is a daytime lighting device, i.e., a device that is employed during the day. The second photometric function 2 is a nighttime lighting device, i.e., a device that is employed when the ambient lighting level passes below a certain threshold. The activation or operation of this second photometric function is controlled by the user of the vehicle via a switch or automatically by means of a light detector installed on the vehicle.

The device according to the invention comprises a housing 3 that forms the back part of the device. This housing is made of an opaque plastic and serves to fix the device to the vehicle and hide the internal mechanisms of the device according to the invention. The open section of the housing 3 is capped or closed-off by a transparent window 4 that forms the part of the device visible to the user, also called the front part of the optic.

The first photometric function 1 takes the form of a lighting means 6 that comprises a support and a light source, the latter being held mechanically by the support. A front face 6a is transparent so as to let the light beam emitted by the light source pass, this transparent face 6a being directly adjacent to the window 4. In practice, this face 6a may consist of a glass or transparent plastic window.

The second photometric function 2 takes the form of a headlamp 5 that lies along a longitudinal direction A. This headlamp 5 comprises, for example, at least one light source, the latter, for example, taking the form of an incandescent lamp, a xenon lamp or else a light-emitting diode. This headlamp 5 comprises, for example, a reflector the function of which is to reflect the light beam towards the window 4, a switching device the function of which is to implement the change from high beam to low beam, a lens that acts to concentrate the light flux and optionally a mask the function of which is to hide certain components of the headlamp 5.

It will be noted that the headlamp 5 lies mainly in an internal volume bounded by the housing 3 whereas the lighting means 6 is installed between the headlamp 5 and the window 4 when the second photometric function is inactive. The lighting means 6 lies along a longitudinal direction B, for example, parallel to the window 4 so as to obscure a substantial amount of its area. The first photometric function 1, for example, consisting of the lighting means 6, thus forms a protective screen that prevents external light rays from hitting the headlamp 5 or the internal wall of the housing 3. This screen may be formed by a support forming part of the lighting means 6. This screen or barrier function is thus provided when on the one hand the second photometric function is inactive (sidelights, low beam or high beam switched off) and on the other hand when the longitudinal direction B of the first photometric function 1 is perpendicular, or substantially perpendicular, to the longitudinal direction A of the second photometric function 2.

The first photometric function is installed or mounted so as to be mechanically connected to a moveable element 8. In the case of the first variant, this moveable element 8 maybe a plate to which the lighting means 6 is rigidly attached. The moveable element 8 may also be formed directly by an external mounting of the lighting means 6 which encloses the support and the light source, the support being rigidly connected, whether directly or indirectly, to the mounting. Alternatively, the support may also form directly the moveable element 8.

The element 8 on which the first photometric function is installed may move translationally, rotationally or via a combination of these two movements. The lighting means 6 forming part of the first photometric function 1 thus follows the movement of the moveable element 8. By way of example, FIG. 1 illustrates by way of four rectangles in succession a rotation about an axis symbolized by the reference 7.

This movement of the moveable element 8 is subject to the operation of the second photometric function. The term "operation" is understood to mean activating or switching on, or deactivating or switching off, the second photometric function 2. In these two cases, the moveable element 8 is set in motion so as to pass from a first extreme position, illustrated in FIG. 1, to a second extreme position illustrated in FIG. 2. In practice the movement of the moveable element 8 is initiated when the user of the vehicle requests use of the second photometric function 2, for example, for the low beam to be switched on. This information may be sensed directly at the switch, directly at the device according to the invention or by the electrical network of the vehicle, for example, when the latter is equipped with a multiplexed network of the CAN or LIN type.

The operation, in other words the switch-on or switch-off, of the first photometric function 1, is also subject to the second photometric function 2. This is because switching on the low beam causes the light source contained in the lighting means 6 to switch off. On the contrary, switching off the low beam causes the light source contained in the lighting means 6 to switch on.

Figure 2:
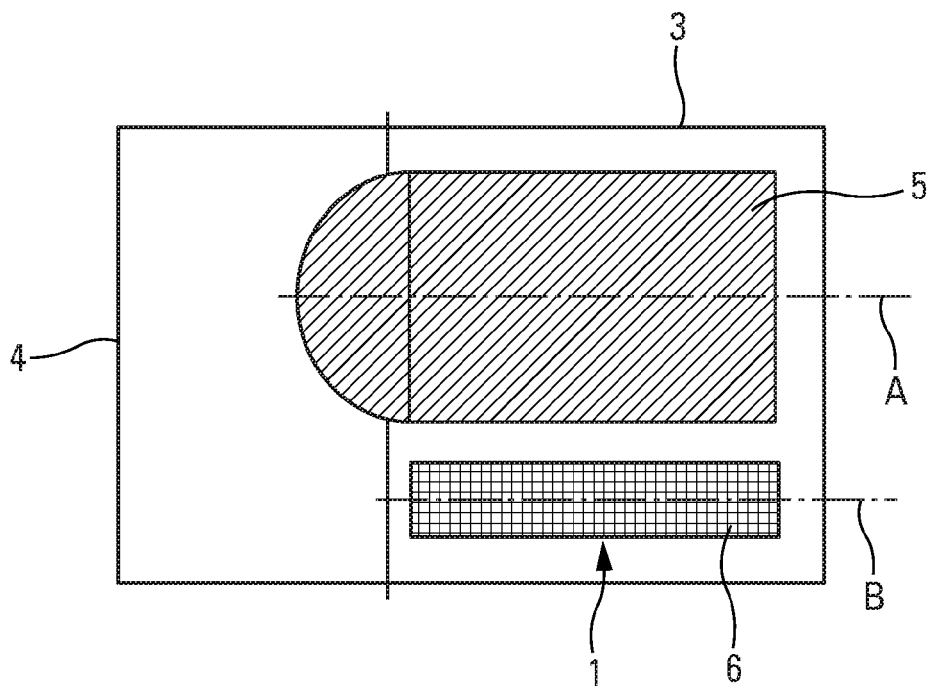
FIG. 2 is a schematic view of the first variant embodiment of the invention when the second photometric function is activated.

FIG. 2 shows the same device as that in FIG. 1 but shown under conditions of night-time use. The space between the window 4 and the headlamp 5 is freed up by moving the first photometric function 1. The lighting means 6 forming part of this first function is then located on the side of the headlamp 5 in the internal volume bounded by the housing 3 and more particularly by the rear part of the housing 3. In this situation, the longitudinal axis B of the first photometric function 1 lies parallel, or substantially parallel, to the longitudinal direction A of the headlamp 5. Such an arrangement makes it possible to completely free up the space between the window 4 and the headlamp 5, and the lighting means 6 does not obstruct the light beam of the projector 5. Alternatively, the lighting means 6 may be located above the headlamp 5 or else below the latter.

In the example given above, the lighting means 6 is placed to the side of the headlamp 5. The expression "to the side" is understood to mean any position around or behind the headlamp 5 provided that the lighting means 6 does not hinder the use of the second photometric function 2.

Figure 3:
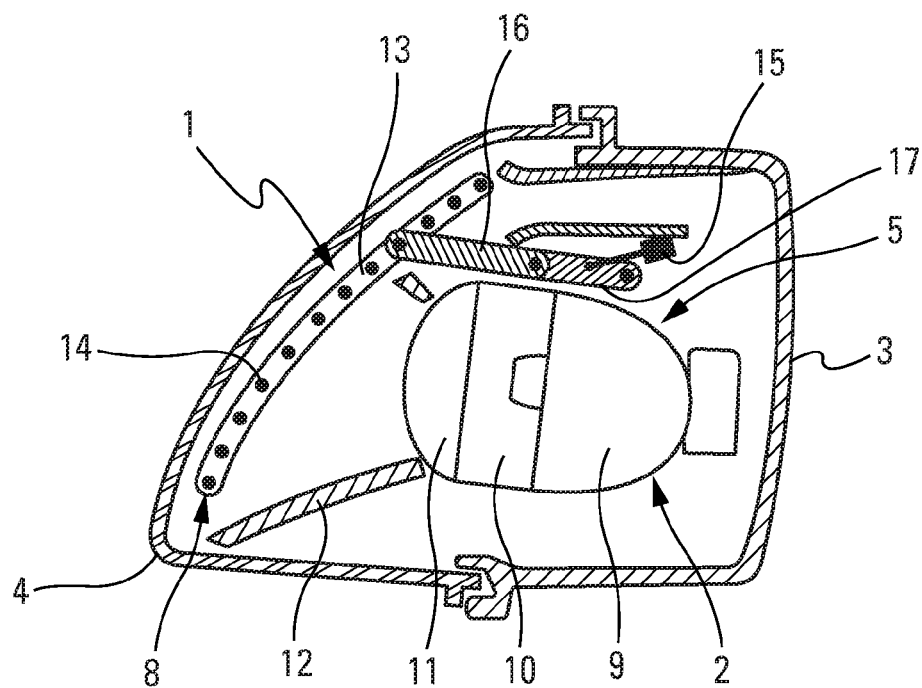
FIG. 3 is a cross-sectional view of the first variant embodiment when the first photometric function is activated.

FIG. 3 shows an exemplary concrete embodiment of a headlight optic according to a first variant embodiment.

The housing 3 and the window 4 bound an internal volume in which the headlamp 5 and the lighting means 6 lie. The headlamp 5 here comprises a light source 9 followed by a switching device 10 and a lens 11. This assembly therefore forms the second photometric function 2. Just after the headlamp 5 a mask 12 is installed having a substantially conical shape and the center of which contains a hole that corresponds substantially to the size of the lens 11.

The first photometric function 1 is here shown in the active position, i.e., between the window 4 and the mask 12, and switched on.

This first photometric function 1 comprises a support that mechanically holds the light source formed by a plurality of light-emitting diodes 14. The support takes the form of a circular arc having a radius substantially equal to the curvature of the window 4.

The movement of the support 13 that forms here the moveable element 8 is operated by means of a, for example, mechanical, electrical or pneumatic, actuating system 15 that acts on linked rods consisting of two levers 16 and 17.

Figure 4:
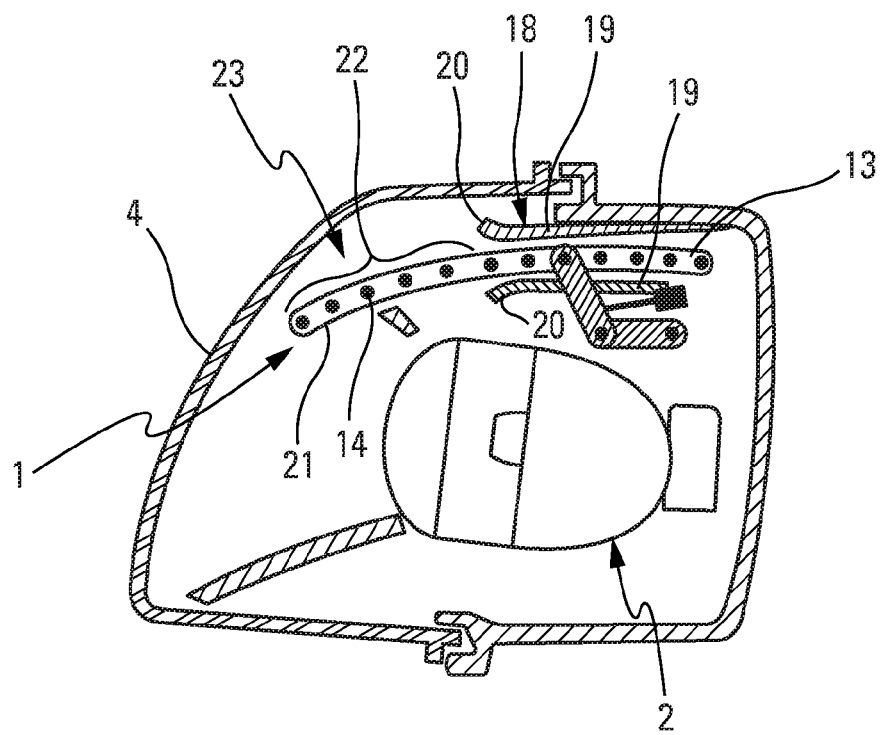
FIG. 4 is a cross-sectional view of the first variant embodiment when the second photometric function is activated.

The housing 3 comprises an internal wall from which emerges a device 18 for holding the first photometric function 1. This holding device receives the support 13 of the first photometric function 1 when the latter is deactivated as illustrated in FIG. 4. This holding device 18 therefore has the function of holding the support 13 in its deactivated position so as to guarantee that the latter frees up the space between the headlamp 5 and the window 4 and thus does not stop the second photometric function 2 from working properly. This holding device 18 comprises two rails 19 separated from each other by a distance equivalent to the thickness of the support 13. Each rail 19 comprises an end 20 on the window 4 side and these ends are curved so as to form together a funnel that makes insertion of the support 13 in the holding device 18 easier.

An improvement to the first variant will now be described. It will more particularly be noted that one end 21 of the support 13 extends beyond, i.e., outside of, the holding means 18 and remains visible through the window 4. Some 22 of the light-emitting diodes 14 installed in line with this end provide the lighting and/or signalling device of the invention with an additional function. This is because the first photometric function 1 is arranged so as to provide a third photometric function 23, separate from the first or second photometric function. In practice, this third photometric function 23 is a sidelight or parking light but it may also be an indicator. Whereas in the preceding variant the plurality of light-emitting diodes was switched off once the second photometric function was activated, in this case some 22 of these diodes located on the end 21 of the support 13 are activated to provide the third photometric function 23. The first photometric function 1 is then used to provide the sidelight function, more particularly by activating a specific region of the support 13, the second photometric function 2 being activated at the same time if required. The first photometric function 1 is therefore controlled by two separate data items and thus provides the daytime lighting function in a first extreme position (between the headlamp 5 and the window 4) and the sidelight or indicator function in a second extreme position (to the side, above or below the headlamp 5) opposed to the first extreme position.

Figure 5:
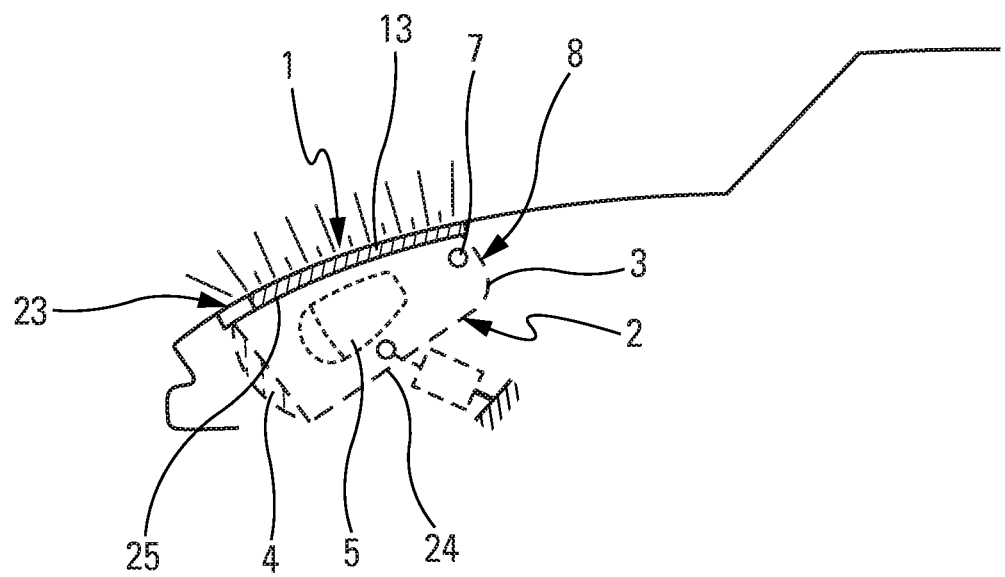
FIG. 5 is a cross-sectional view of a second variant embodiment when the first photometric function is activated.

FIG. 5 illustrates a second variant embodiment suited to the retractable headlights of sports vehicles. The first photometric function 1 and the second photometric function 2 are both assembled on the moveable element 8. The latter therefore serves to support these two photometric functions mechanically. In the present case, the moveable element 8 is formed by the housing 3 that encloses the second photometric function 2, in this case the headlamp 5. The housing 3, for example, has a window 4, a lower wall 24 and an upper wall 25. The latter forms the support 13, or receives the support 13, on which the light source, consisting of a plurality of light-emitting diodes, is installed.

The first photometric function 1 and the second photometric function 2 can rotate about the same axis 7. These two functions rotate simultaneously because the two photometric functions are rigidly connected to one and the same moveable element 8.

When the second photometric function 2 is inactive, it folds into the interior of the bodywork of the vehicle and the first photometric function 1 is activated or switched on. This is the situation under daytime conditions.

Figure 6:
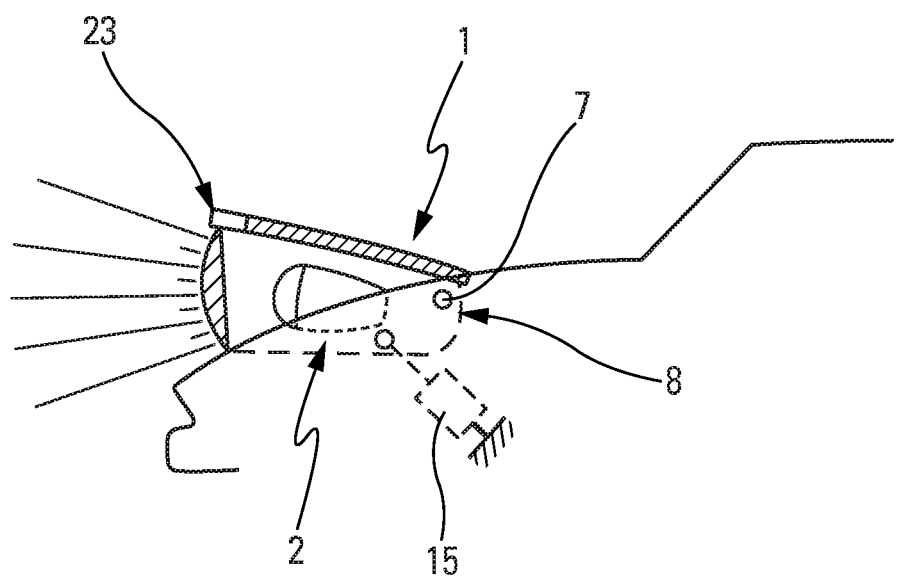
FIG. 6 is a cross-sectional view of the second variant embodiment when the second photometric function is activated.

FIG. 6 illustrates the same variant but under night-time conditions. Under such conditions, the second photometric function 2 is activated thereby causing the headlight to open or exit from the bodywork of the vehicle, and optionally the first photometric function 1 to switch off.

The rotation of the element 8 about the axis 7, between the situation shown in FIG. 5 and the situation shown in FIG. 6, is operated by the actuating system 15. The latter is a mechanical, electrical or pneumatic system that is connected via a hinge at one end to the moveable element 8 and at the other end to the body of the vehicle.

The third photometric function 23 is also illustrated in FIGS. 5 and 6. As in the first variant, it is formed from one end of the support 13 which holds at least one light source, for example, a light-emitting diode.

Figure 7:
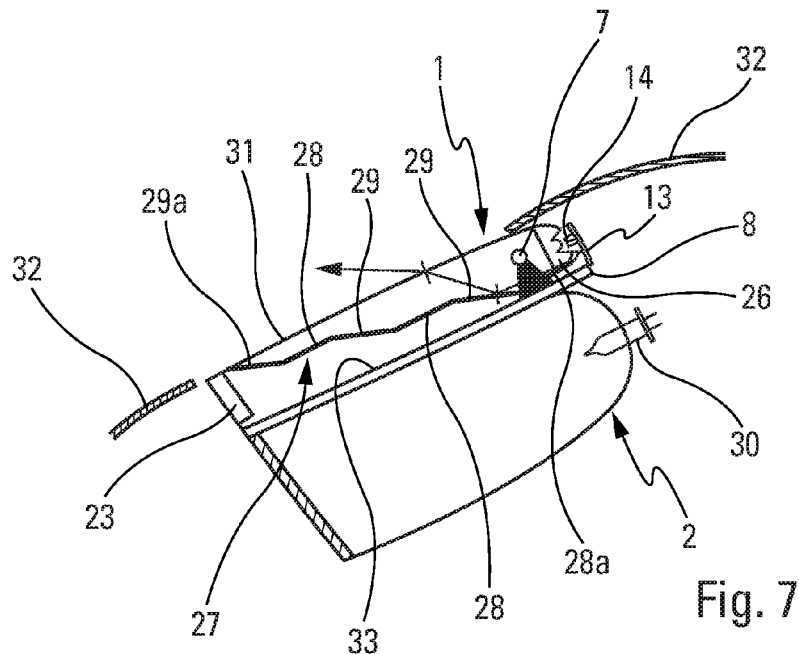
FIG. 7 is a cross-sectional view illustrating certain components of the device according to the invention according to the second embodiment.

FIG. 7 shows in detail the structure of the lighting and/or signalling device of the second variant of the invention. The first photometric function 1 is placed on the second photometric function 2 and they are rigidly connected to each other. Advantageously, these two functions form a unitary assembly.

Contrary to FIGS. 5 and 6, the rotation axis 7 is here part of the first photometric function 1 it being connected to the moveable element 8. In this exemplary embodiment, the support 13 is formed by a printed circuit board that lies in a plane substantially perpendicular to the moveable element 8. The support 13 is mechanically connected to the moveable element 8. The printed circuit board then serves as a receiving support for delivering power and for mechanically holding the plurality of light-emitting diodes 14. A transparent window 31 dedicated to the first photometric function 1 takes the form of a flat plate that lies substantially parallel to the moveable element 8. Furthermore, it will be observed that the support 13 and the plurality of light-emitting diodes 14 are installed outside of the internal volume bounded by the window 31 and the moveable element 8.

The window 31 has an end 26 immediately adjacent the plate 13 that supports the light-emitting diodes 14. This end 26 is shaped into dioptric collimators so as to direct the light flux towards the internal volume bounded by the window 31 and the moveable element 8. A reflector 27 associated with the first photometric function 1 is also located in this internal volume. This reflector is a generally flat component installed between the end 26 of the window 31 and an opposite end of this window, the latter forming the third photometric function 23. This reflector 27 is transparent and comprises an alternation of flats 28 and oblique slants 29. The flats 28 lie in a plane substantially parallel to the plane in which the moveable element 8 lies and the oblique slants lie in a plane inclined at an angle lying between 20° and 45° to the plane of the flats 28. A final oblique slant 29a comprises an end that makes contact with the window 31 whereas a first flat 28a has an end that extends to the prismatic end 26. The light source of the second photometric function 2 is here shown in the form of an incandescent bulb 30.

Just as for the variant in FIG. 5, it will be noted that the window 31 of the first photometric function 1 lies in a plane parallel to and generally coincident with the plane of the bodywork 32 of the vehicle. The moveable element 8 that here serves as a plate for holding components of the first photometric function 1 comprises a face 33 turned towards the window 31. As the window 31 and the reflector 27 are transparent, the face 33 is painted the color of the bodywork 32, thereby contributing to increase the aesthetical integration of the daytime lighting function.

Of course, the reflection function provided by the reflector 27 may be provided by the face 33, the first photometric function then comprising no reflector.

Figure 8:
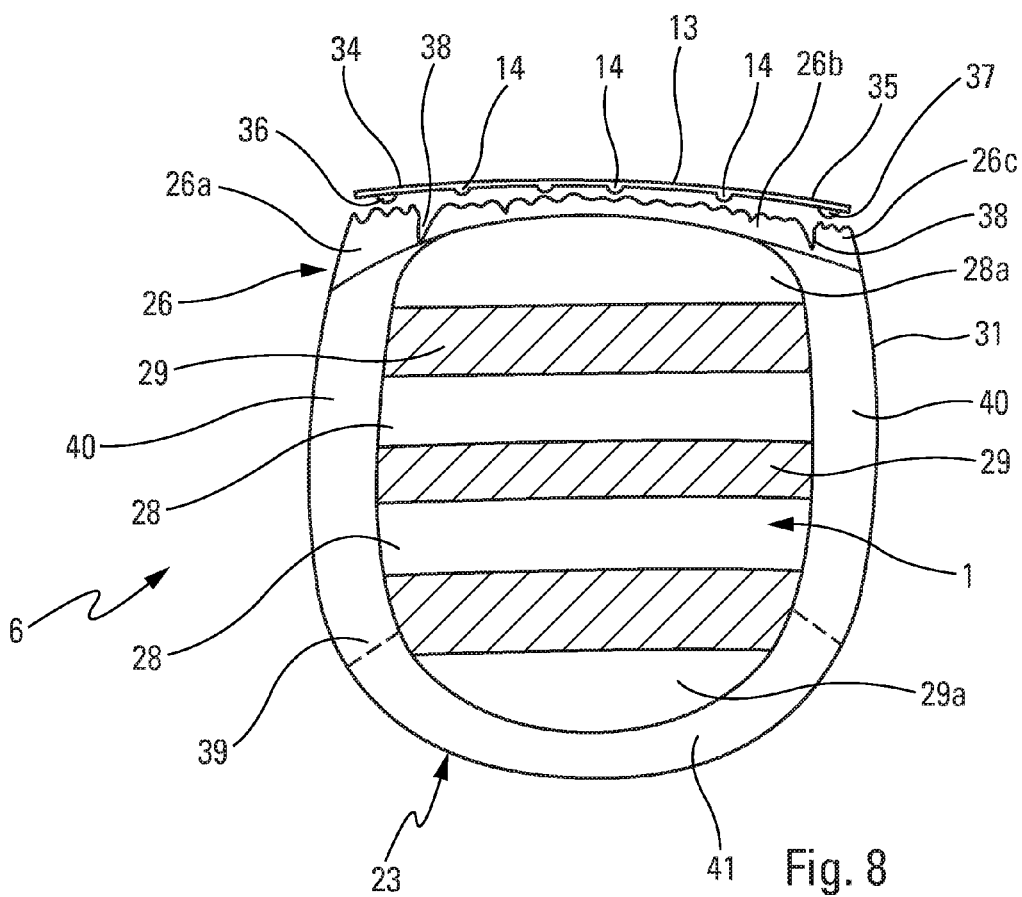
FIG. 8 is a top view of the device according to the invention integrating a third photometric function.

FIG. 8 illustrates the first photometric function as seen from above. The prismatic end 26 of the window 31 and the alternation of flats 28 and oblique slants 29 may be seen.

The support 13 is formed by the printed circuit board to which the light-emitting diodes 14 are rigidly attached. The printed circuit board has two ends 34 and 35 to which at least one light-emitting diode 36 or 37 is fixed. These additional diodes 36 and 37 form part of the first photometric function 1 and/or of the third photometric function 23. The prismatic end 26 shaped into dioptric collimators is divided into three parts 26a, 26b and 26c, the reference 26b denoting a central part installed between the two side parts denoted by the references 26a and 26c. In practice, the central part 26b is used for the first photometric function 1 whereas the side parts 26a and 26c are used for the third photometric function 23. The central part 26b and the side parts 26a and 26c are separated by a groove 38 formed by removing material from the prismatic end 26. Thus the light flux from the additional diodes 36 and 37, when they are used for the third photometric function, is prevented from travelling towards the reflector 27 and being seen as the daylight lighting.

A light guide 39 is integrated into the lighting means 6 forming the first photometric function. This light guide 39 may only be a part of the first photometric function 1 or only part of the third photometric function but this light guide 39 may optionally be employed simultaneously in the first and third photometric function. Alternatively, the lighting means 6 may comprise a plurality of separate light guides each dedicated to a photometric function.

This light guide 39 is formed from a transparent plastic. In an exemplary embodiment, the light guide 39 has the shape of an arc. In other words, the light guide extends along a curve that in the example shown in FIG. 8 is "U"-shaped. This "U" shape thus bounds the third photometric function 23 and the part located between the arms 40 and a base 41 of the "U" bounds the first photometric function 1. Each end of the arms 40 of the "U" is placed in front of each side part 26a and 26c of the prismatic end 26. Thus the light flux emitted by the additional diodes 36 and 37 is deflected by the side parts 26a and 26c before entering into the light guide 39 via its ends. At this stage, the direction of the light flux is substantially parallel to a longitudinal direction in which each arm 40 of the "U" lies. The light flux then travels along the arms 40 of this "U" without exiting via its sides. The base 41 lies in a direction generally perpendicular to the longitudinal direction of the arms 40. This configuration makes it possible for the light flux to exit the light guide 39 via the base 41, in order for the third photometric function 23, for example, the sidelight or indicator, to be seen.

It is important to note that the plurality of light-emitting diodes 14 is used both for the first photometric function 1 and for the third photometric function 23. This is because the additional diodes 36 and 37 form part of the plurality of light-emitting diodes 14 and are used in the context of the two aforementioned functions. Thus, when the daytime lighting function is used, all the light-emitting diodes, including the additional diodes 36 and 37, are activated. The lighting means 6 then delivers a light flux to the base 41 of the light guide 39 and between the arms 40 of this same light guide, i.e., to the reflector 27. On the other hand, when the third photometric function 23 is activated, only the additional diodes 36 and 37 are switched on so that only the base 41 of the light guide is visible. Such a structure makes it possible to avoid actuating or opening the retractable headlight while the sidelight function is active, the sidelight function being sufficiently distinct from the daytime lighting for it not to be confused with the latter.

Of course, the invention also covers the case where the third photometric function is activated at the same time as the second photometric function. The headlamp is thus switched on to provide the low- or high-beam function while the sidelight function is also switched on.

While the system and apparatus herein described constitute preferred embodiments of this invention, it is to be understood that the invention is not limited to this precise system and apparatus, and that changes may be made therein without departing from the scope of the invention which is defined in the appended claims.

What is claimed is:

1. A lighting or signaling device arranged so as to provide at least a first photometric function and a second photometric function, wherein said lighting or signaling device comprises at least one moveable element on which said first photometric function is installed and the movement of which is subject to the operation of said second photometric function;
    said first photometric function comprises at least one light source that becomes switched between said first photometric function and said second photometric function;
    wherein in said second photometric function, said at least one moveable element moves from a first position to a second position and said second photometric function becomes switched on;
    wherein said lighting or signaling device further comprises a printed circuit board having at least one diode for performing said first photometric function, said printed circuit board being mounted on said at lest one moveable support is in said first position, said first photometric function provides a screen or barrier that prevents external light rays from hitting said second photometric function and that makes said first photometric function substantially less visible, whereby said movement of said at least one moveable support between said first position and said second position causes operation of said first photometric function and said second photometric function, respectively.

2. The lighting or signaling device according to claim 1, in which the operation of said first photometric function is subject to said second photometric function.

3. The lighting or signaling device according to claim 1, in which said at least one moveable element can rotate.

4. The lighting or signaling device according to claim 1, in which said first photometric function comprises at least one light source comprising at least one light-emitting diode.

5. The lighting or signaling device according to claim 4, in which said first photometric function takes the form of a lighting means that comprises a support receiving said at least one light source.

6. The lighting or signaling device according to claim 5, in which said lighting means comprises a support formed by a printed circuit board and at least one light guide.

7. The lighting or signaling device according to claim 1, in which said photometric function takes the form of a headlamp.

8. The lighting or signaling device according to claim 1, in which said at least one moveable element bears said second photometric function.

9. The lighting or signaling device according to claim 1, comprising a housing inside of which are installed a headlamp forming said second photometric function and a light-emitting-diode-based light source forming said first photometric function.

10. The lighting or signaling device according to claim 9, in which said first photometric function takes the form of a lighting means that comprises a support receiving a light source, said lighting means forming a screen protecting said housing.

11. The lighting or signaling device according to claim 1, in which said first photometric function also serves to provide a third photometric function.

12. The lighting or signaling device according to claim 11, in which said first photometric function comprises at least one light source comprising a plurality of light-emitting diodes, some of these diodes being arranged so as to provide said third photometric function.

13. The lighting or signaling device according to claim 12, in which said lighting means comprises a support formed by a printed circuit board and at least one light guide.

* * * * *

UNITED STATES PATENT AND TRADEMARK OFFICE
CERTIFICATE OF CORRECTION

| | | |
|---|---|---|
| PATENT NO. | : 8,690,401 B2 | Page 1 of 1 |
| APPLICATION NO. | : 13/220842 | |
| DATED | : April 8, 2014 | |
| INVENTOR(S) | : Bakacha et al. | |

It is certified that error appears in the above-identified patent and that said Letters Patent is hereby corrected as shown below:

In the claims

Claim 1, Column 10, line 8, please delete "lest" and insert --least-- therefor.

Claim 7, Column 10, line 32, insert --second-- before "photometric function.".

Signed and Sealed this
Twenty-fourth Day of November, 2015

Michelle K. Lee
*Director of the United States Patent and Trademark Office*